Dec. 12, 1944.   W. D. AVERILL ET AL   2,365,040
BROACHING MACHINE
Filed Feb. 20, 1941   5 Sheets-Sheet 1
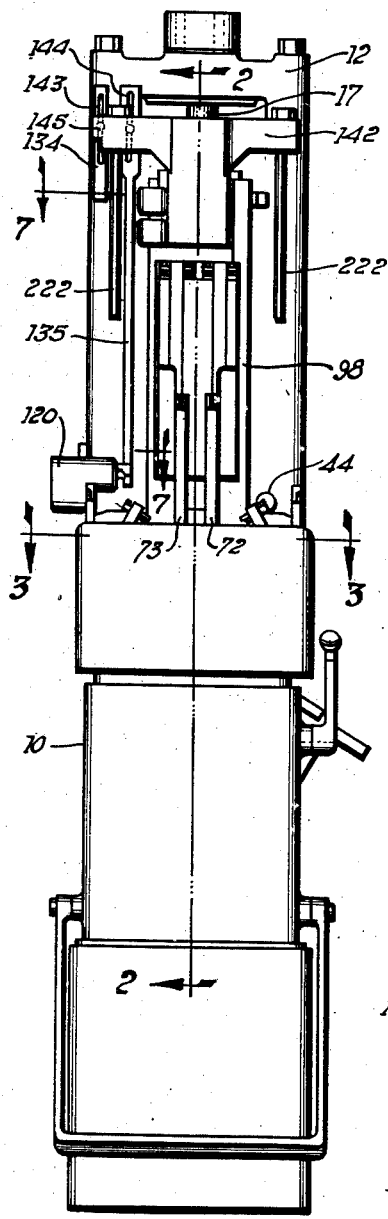
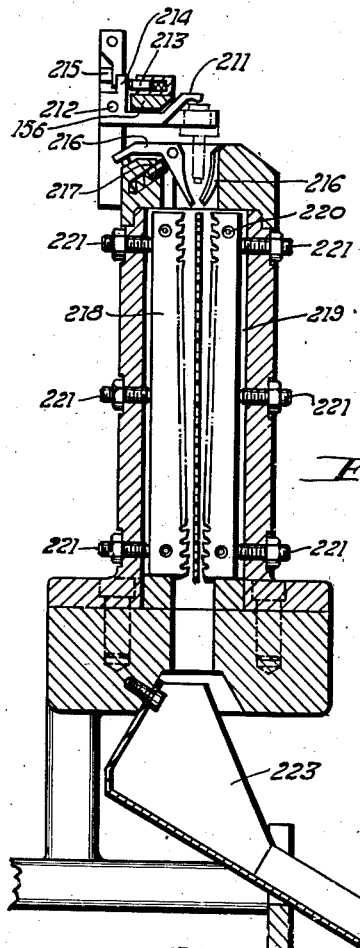
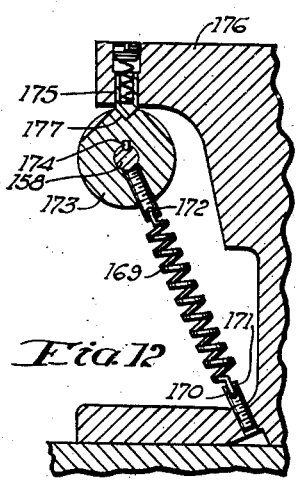
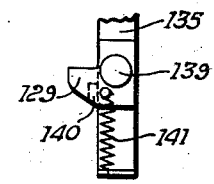
INVENTOR.
WILLIAM D. AVERILL
AUGUST L. HAMELBERG
BY
ATTORNEY.

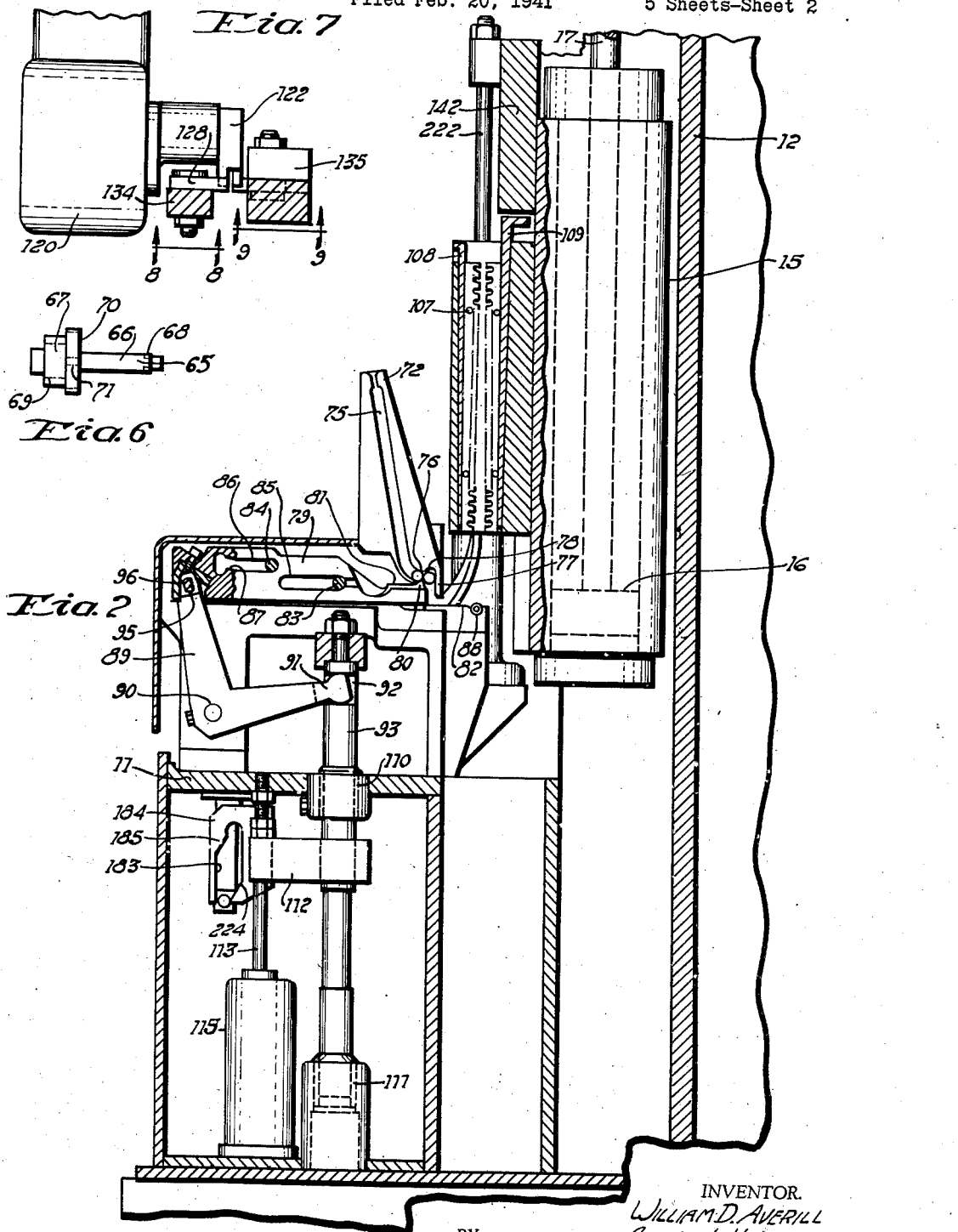

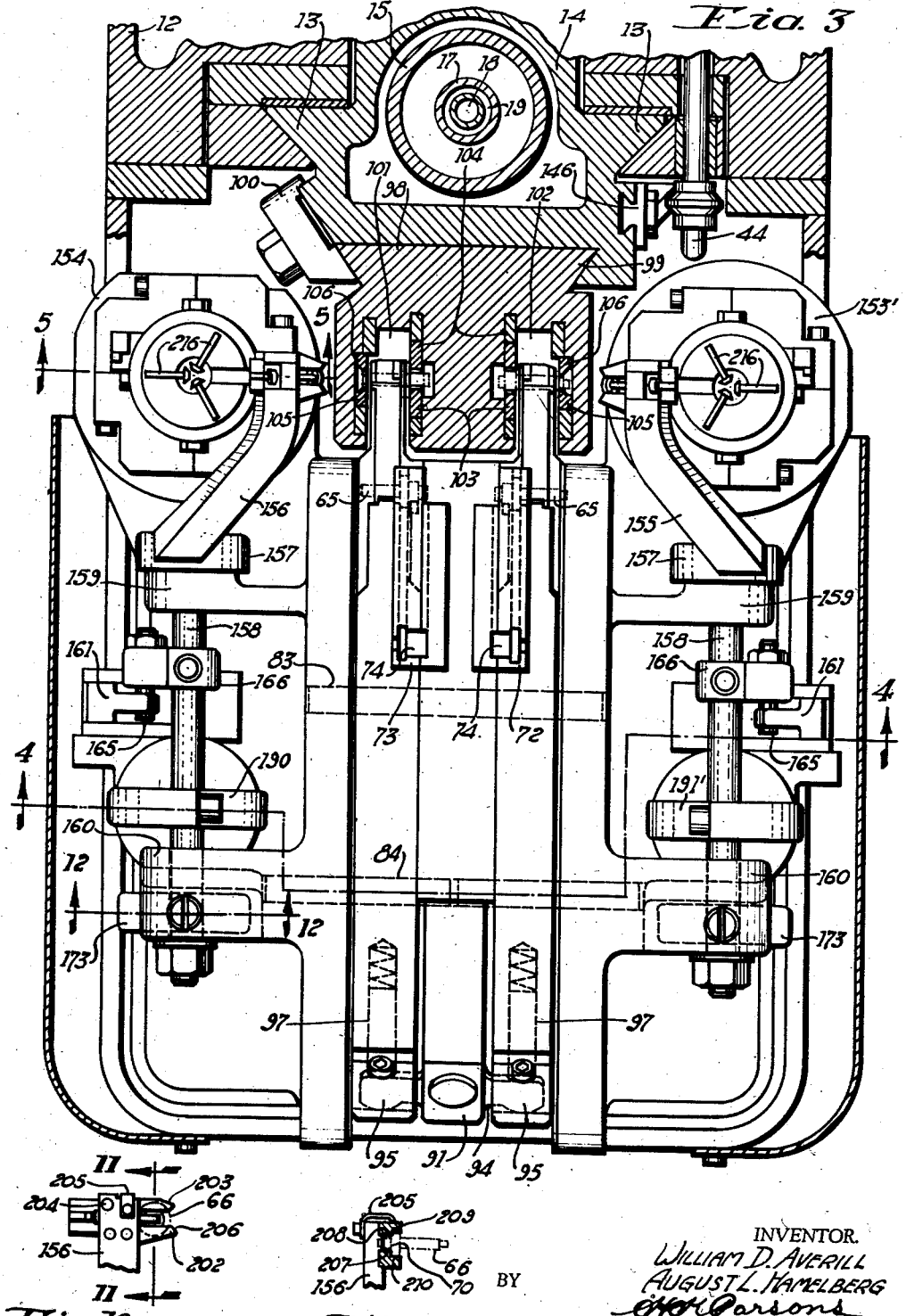

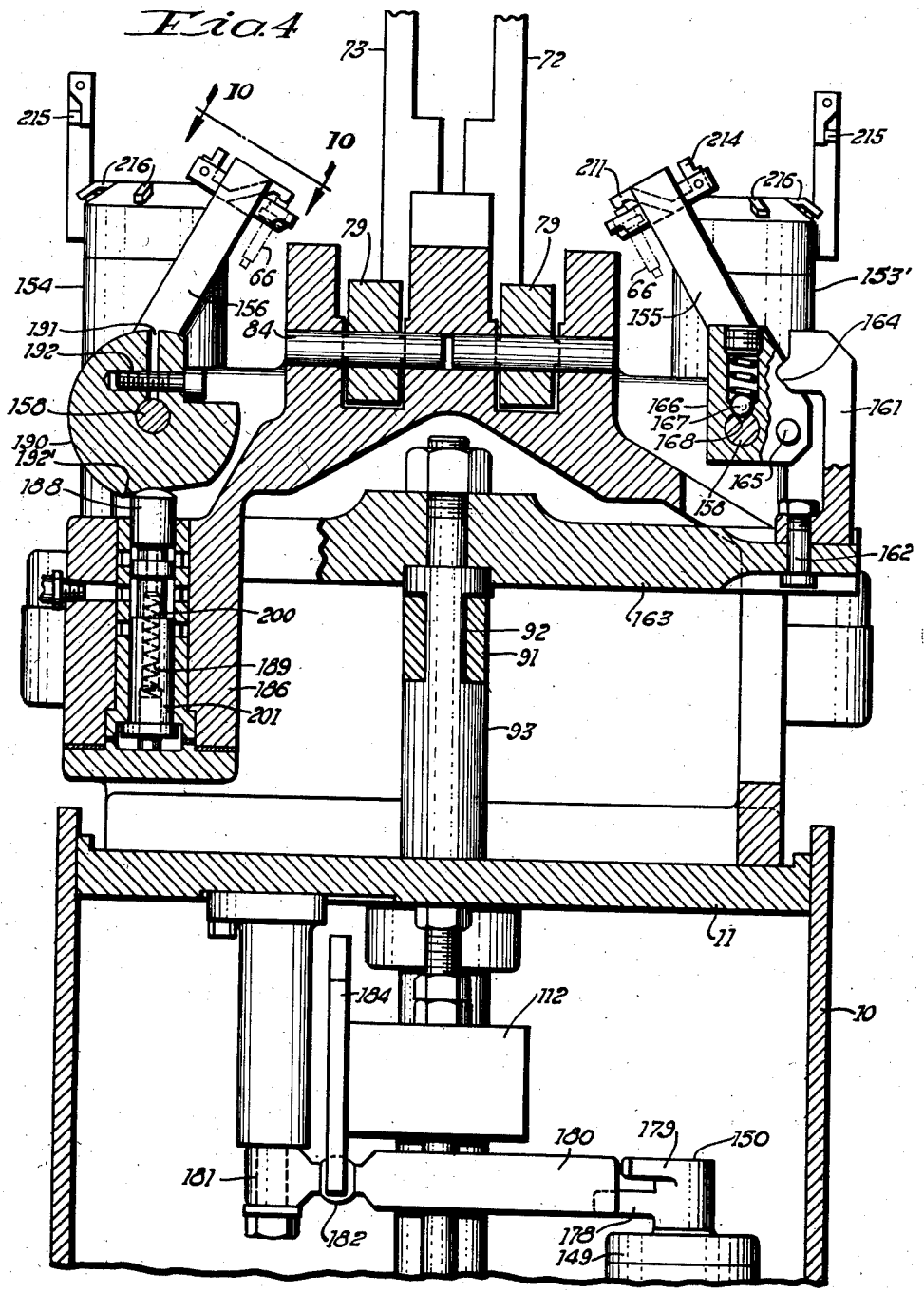

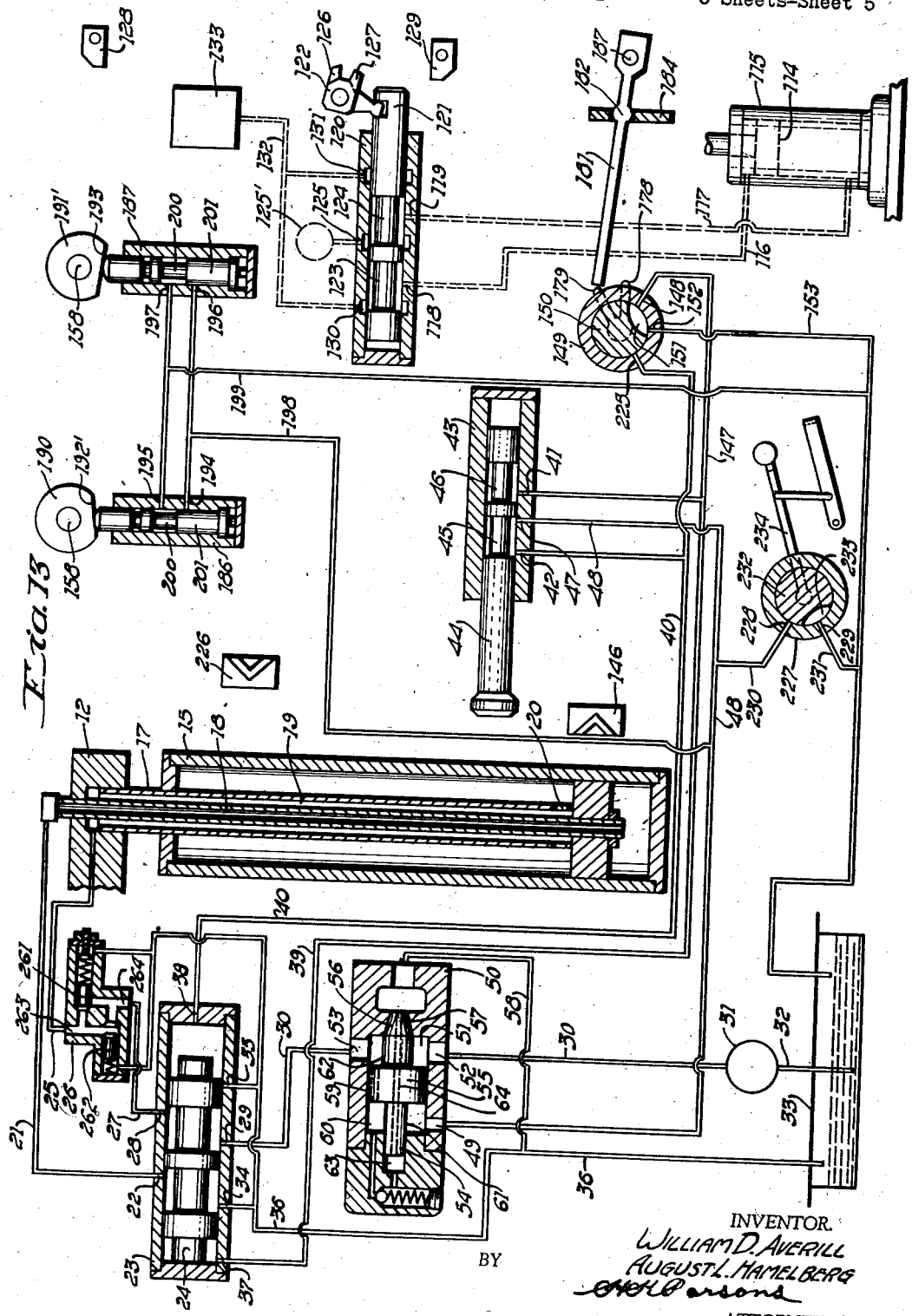

Patented Dec. 12, 1944

2,365,040

UNITED STATES PATENT OFFICE 2,365,040

BROACHING MACHINE

William D. Averill and August L. Hamelberg, Cincinnati, Ohio, assignors to The Cincinnati Milling Machine Co., Cincinnati, Ohio, a corporation of Ohio Application February 20, 1941, Serial No. 379,862

22 Claims. (Cl. 90—33)

This invention relates to machine tools and more particularly to automatic broaching machines.

One of the objects of this invention is to provide an automatic broaching machine which will perform separate broaching operations on the same work piece in successive cycles of the machine.

Another object of this invention is to provide improved means in a broaching machine for automatically injecting and transferring work among the successive broaching stations.

A further object of this invention is to provide a duplex broaching machine which in a single cycle will effect one broaching operation on two different work pieces and a different broaching operation on two other work pieces.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a broaching machine embodying the principles of this invention.

Figure 2 is an enlarged sectional view on the line 2—2 of Figure 1.

Figure 3 is an enlarged plan view with some parts in section showing the work supporting and transferring mechanism as viewed on the line 3—3 of Figure 1.

Figure 4 is a sectional view on the line 4—4 of Figure 3.

Figure 5 is a sectional view on the line 5—5 of Figure 3.

Figure 6 is a view of a work piece that may be broached in this machine.

Figure 7 is a section on the line 7—7 of Figure 1.

Figure 8 is a view on the line 8—8 of Figure 7.

Figure 9 is a view on the line 9—9 of Figure 7.

Figure 10 is a detail view on the line 10—10 of Figure 4.

Figure 11 is a section on the line 11—11 of Figure 10.

Figure 12 is a section on the line 12—12 of Figure 3.

Figure 13 is a diagrammatic view of the hydraulic control circuit.

Referring to Figure 1 of the drawings, the machine comprises in general a base 10, a platform 11 as shown in Figure 2 on which the work supporting and clamping means are mounted, and a column 12 in which is formed dovetail guideways 13 as more particularly shown in Figure 3 for supporting and guiding a reciprocable ram 14.

As shown in Figure 2, the ram has a cylinder 15 formed integral therewith and containing a piston 16 which is operatively connected by a piston rod 17 to the top of the column 12 as shown in Figure 1 whereby the piston rod is stationary and the cylinder moves with the ram. The piston rod is of double tubular construction having a central passageway 18, Figure 13, which communicates with the end of the cylinder below the piston rod and a second annular passage 19 which communicates by means of radial holes 20 with the cylinder space above the piston. The passage 18 is connected by a channel 21 to port 22 of a reversing valve 23 having a reciprocable valve plunger 24. The space 19 is connected by channel 25, check valve 26 and channel 27 to port 28 of the reversing valve.

The check valve 26 has two check valve plungers 261 and 262 connected in parallel between ports 263 and 264 but opposite acting whereby when the pressure at port 264 is greater than the pressure at port 263, valve plunger 262 will open to permit admittance of fluid to the upper end of the cylinder to effect elevation of the ram. When the pressure at port 263 is greater than the pressure at port 264 plunger 262 closes, and plunger 261 opens to permit exhaust of fluid from the upper end of the cylinder during descent of the ram.

Attention is invited to the fact that the spring of plunger 261 is set to a higher value than the other plunger whereby the pressure created in channel 25 due to the weight of the ram will not cause opening of the valve plunger 261, thereby preventing the ram from dropping should the pressure in the system suddenly fail, or when the machine is shut down.

The reversing valve has a pressure port 29 which is connected by channel 30 to the output of a pump 31 having an intake 32 through which fluid is withdrawn from a reservoir 33. The reversing valve also has a pair of exhaust ports 34 and 35 which are connected by a common return channel 36 to the reservoir 33. It should now be obvious that when the plunger 24 is in its left hand position as shown in Figure 13 that fluid pressure will be delivered to the upper end of cylinder 15 and that the lower end of the cylinder will be connected to reservoir whereby the ram 14 will move upward; and when the plunger 24 is shifted to the right, the port 29 will be connected to port 22, and port 28 connected to port 35 whereby pressure will be admitted to the lower end of cylinder 15 and the upper end will be connected to exhaust, thus causing downward movement of the ram.

The shifting of reversing plunger 24 is effected hydraulically and to this end the ports 37 and 38 located at opposite ends of the valve housing 23 are connected by channels 39 and 40 to ports 41 and 42 of a trip operated pilot valve 43. This valve has a plunger 44 in which is formed a pair of annular grooves 45 and 46 for alternately connecting ports 41 and 42 to an intermediate port 47. The port 47 is connected by channel 48 to port 49 of a relief valve 50.

The valve 50 is an automatic by-pass valve which serves as a start and stop valve. It has a chamber 51 which is always connected by ports 52 and 53 in series with the line 30, forming a part thereof. A plunger 54 having enlarged spool 55 is slidably mounted within the valve and one end of the plunger is tapered at 56 to form a valve which closes the port 57. This port is connected by channel 58 to the reservoir line 36. The spool 55 is provided with an axial passage 59 through which fluid flows from the chamber 51 to the chamber 60. The portion 61 of the plunger is smaller in diameter than the portion 62, thereby providing a larger pressure area on the left side of the spool 55 whereby when the pressure in chambers 51 and 60 are equal, the end pressure on the left side of the spool 55 is greater than the total pressure on the right side which produces a force resultant which maintains the valve 57 closed. If for any reason the pressure in chamber 60 drops to a point that the total pressure on the left end of the spool is less than the total pressure on the right end, the valve will move to the left, opening the port 57 whereupon the pump will be by-passed to reservoir and the pressure in channel 30 will drop below that necessary for actuating purposes.

It should now be evident that when the plunger 54 is in a position to close the port 57 that the unit pressure in channel 48 will build up equal to pump pressure and therefore the port 47 of the pilot valve 43 will be a pressure port and will thus deliver fluid for actuation of the reversing valve plunger 24. In other words, in the position of the parts shown, fluid pressure is being delivered to port 47 which will flow through channel 40 to the right hand end of the reversing valve housing 23 and shift the plunger 24 to its left hand position.

In order to make possible a pressure differential in chambers 60 and 51 of the by-pass valve, the portion 61 of the plunger extends into a bore 63, and to prevent the creation of vacuum or excessive high pressure from interfering with the movement of the plunger, a small axial bore 64 is drilled through the center of the plunger to establish constant communication with the return line 58, thus breaking any vacuum which might form, or draining off any fluid that might accumulate in the end of the bore through leakage.

The work piece to be broached by this machine is indicated by the reference numeral 65 in Figure 6 and is made up of various cylindrical portions, the portions 66 and 67 of which have flats 68 and 69 to be broached on opposite sides thereof, and an enlarged spool portion 70 is to have four longitudinal grooves 71 broached in the periphery thereof and equally spaced thereabout.

The machine is a duplex machine and is provided with means for handling two of these work pieces at the same time for each operation. To this end a right and a left hand hopper 72 and 73 are provided, as shown in Figures 1, 3 and 7, into which the work is loaded by the operator. These hoppers are provided with work receiving grooves 74 which are enlarged to receive the enlarged spool 70 of the work piece. The work is loaded in the hopper so that the end portions 66 extend in opposite directions as shown in Figure 3. Referring to Figure 2, the passageway in the hopper which is indicated generally by the reference number 75 is inclined at a slight angle so that the work piece will slide down by gravity to the bottom of the hopper where the groove is curved to provide an almost horizontal portion 76.

This portion communicates with a vertical passage 77 which it will be noted is recessed at 78. A work injector slide 79 has an upwardly extending lip 80 which, when the slide is in a returned position restricts the passage of work through the throat 76. As the slide 79 advances and the lip moves forward, or to the right, as viewed in Figure 2, a work piece is permitted to advance into the vertical passage 77 of the hopper but is held in that position by the flat 81 formed in the slide 79. When the slide returns again, the work piece that is in the vertical passage rides over the lip 80 by virtue of the recess 78 and falls upon the work support 82 while the lip engages the next work piece and prevents it from falling. Thus, only one work piece is delivered to the work support 82 for each reciprocation of the work injecting slide 79.

The work injector slides are supported on a pair of pins 83 and 84 which are spaced longitudinally of the slide. The pins are fixed, while the slides are provided with slots 85 and 86. The slot 85 extends parallel to the axis of the slide throughout its length, while the slot 86 has a cam surface 87 for depressing the end of the slide about the pin 83 as it moves forward to push the work piece into the work holding groove 88.

Depressing the rear end, elevates the front end of the slide as the work piece drops into the groove so that the front end will ride over the top of the work piece and eventually act as a clamp to hold the work piece in the groove 88.

Both slides are moved simultaneously by a bell crank 89 which rotates about a fixed pivot 90 and has one arm bifurcated at 91 for engaging grooves 92 formed in opposite sides of a reciprocator 93. As shown in Figure 3 the upper end of the bellcrank is provided with a pivoted equalizer lever 94 having ball-shaped ends 95 which engage slots 96 formed on the underside of the injector slides 79. Spring pressed plungers 97 are mounted in the end of the slides 79 and exert continuous pressure on the ends of the equalizer 94. Thus as the bell crank is rotated in a clockwise direction, as shown in Figure 2, the spring pressed plungers 97 provide the necessary resilience in the connections to insure that equal pressure is applied to each slide and that the clamping of one piece does not interfere with the proper clamping of the other.

The broaching tools for operating on the work at the first broaching station are mounted in a block 98, Figure 3, which has a dovetailed guide 99 by which it is clamped to the broaching ram 14 by the clamping members 100. This block has two longitudinal grooves 101 and 102 and the broaching tools are mounted on the sides of these grooves. There is a first set of broaching tools 103 and 104 in the groove 102 and a similar set in the groove 101 for broaching the flat surfaces 69 on one end of each work piece, and pairs of tools 105 and 106 mounted in the respective slots for broaching the flat surfaces 68 on the other end of each work piece. One set of these latter tools is shown in Figure 2 and it will be noted that they are clamped into position by clamping bolts 107 after being properly spaced apart by adjustable gibs 108 and 109. The same means are utilized for clamping the other sets of broaching tools in the various grooves.

The power actuated reciprocator 93 is guided for vertical reciprocating movement by spaced sleeves 110 and 111, and operatively connected by an arm 112 to a piston rod 113 of an air operated piston 114. The piston is contained in an air cylinder 115, the opposite ends of which are connected by pipes 116 and 117 as shown in Figure 13 to ports 118 and 119 of a reversing valve 120. This valve has a plunger 121 which is shifted by a dog-actuated crank 122. The plunger has annular grooves 123 and 124 for alternately connecting a pressure port 125 supplied by conventional means with a compressor indicated by numeral 125' to ports 118 and 119. The crank 122 has radially extending fingers 126 and 127 which lie in separate planes for engagement by trip dogs 128 and 129.

The valve 120 has a pair of ports 130 and 131 which are connected by channel means 132 to a muffler 133 whereby when these ports are alternately connected to ports 118 and 119 respectively the high pressure air being exhausted from the cylinder 115 will be delivered to the muffler, thereby insuring quiet operation of the machine.

The dogs 128 and 129 which operate the reversing valve for the air cylinder are pivotally mounted upon the end of adjustable support bars 134 and 135 as more particularly shown in Figures 8 and 9. Referring to Figure 8, the dog 128 is pivotally mounted on a bolt 136 and is provided with a lug 137 which prevents counterclockwise rotation of the dog by a spring 138, thus holding the dog in the proper position for actuation of the crank 122 upon downward movement of the ram. During upward movement of the ram the dog is free to be rotated clockwise, thereby snapping by the crank without operating it.

The dog 129 is similarly pivoted on a bolt 139 on the support 135 and is held against counterclockwise rotation by a lug 140 against the action of a spring 141. It will be noted that the dog 129 is mounted so as to be effective during upward movement of the ram and ineffective during downward movement of the ram.

The supports 134 and 135 are mounted on a T-shaped bracket 142 which is attached to the ram as shown in Figure 1. The supports have elongated slots 143 and 144 respectively by which they may be adjusted relative to fixed clamping bolts 145 which are threaded in the bracket 142. This makes it possible to adjust the length of the ram stroke and also the zone of movement of the ram.

As the broaching ram completes its upward movement the dog 129 shifts the air valve plunger 121 whereby air pressure is admitted to the upper end of cylinder 115, causing downward movement of the piston 114 and connected actuating rod 93. Immediately thereafter a trip dog 146 carried by the broaching ram as shown in Figure 3 shifts the pilot valve plunger 44 whereby the port 47 becomes interconnected with the port 41. This would potentially effect the shifting of the reversing valve plunger 24 but the channel 39 through which the fluid would flow from port 41 to port 37 of the reversing valve has a branch line connection 147 to port 148 of an interlock valve 149. This valve has a rotatable plunger 150 in which is formed a groove 151 which at this time is positioned to connect the port 148 to exhaust port 152. This exhaust port is connected by channel 153 to the reservoir 33.

Thus, the immediate effect of shifting the pilot valve plunger 44 is to connect the chamber 60 of the by-pass valve 50 to reservoir which reduces the pressure in that chamber sufficiently to permit the pressure in chamber 51 to shift the plunger 55 to the left, thus opening the port 57 whereby the delivery of pump 31 is by-passed to reservoir through channels 58 and 36. This results in a loss of pressure for ram actuating purposes whereby the ram will stop.

While the ram is being stopped by the method just explained the air piston 114 is continuing its downward movement, rotating the bell crank 89 to insert and clamp a new work piece in the work receiving groove 88. Simultaneously a work transferring mechanism which had picked up the partially finished work piece from groove 88 at the end of the downward stroke of the broaching ram in a manner to be explained later loads this work piece at a second broaching station located at the mouth of tunnel broaches indicated by the reference numerals 153' and 154 in Figures 3 and 4 of the drawings.

Oscillatable transfer arms 155 and 156 serve to carry the work from one broaching station to the next. These arms are normally held in the intermediate position in which they are shown in Figure 4 by similar centralizing mechanisms, one of which is shown in Figure 12.

Each arm has a boss 157 by which it is keyed to the end of a shaft 158. The shaft is rotatably supported in bearings 159 and 160. Rotation of the shaft is effected by an arm 161 which is bolted at 162 to a yoke 163 fastened to the upper end of the rod 93 as more particularly shown in Figure 4. The arm 161 has a cam surface 164 which is adapted to engage a pin 165 projecting laterally from a crank 166. The crank is releasably connected to the shaft 158 by a spring pressed ball 167 engaging a V-shaped groove 168 formed in the shaft. Should the arm 155 become caught for any reason, the connection will yield so as to prevent damage to the parts.

When the actuating rod 93 is moved downward by the piston 114 the cam surface 164 engages the pin 165 and rotates the arm 155 into a vertical position for transfer of the work to the second broaching station. The arm 161 moves down sufficiently to clear the pin 165 whereby the arm is free to be returned to its intermediate position. This return movement is effected by a spring 169 as shown in Figure 12 which has one end 170 attached to a fixed support 171 and the other end attached to the end of a pin 172 which is threaded radially into a disc 173 keyed at 174 to the shaft 158. To insure that the arm 155 assumes a definite position a spring pressed detent 175 is slidably mounted in a fixed support 176 for engagement with a V-shaped notch 177 formed in the periphery of the disc 173.

As the plunger 93 completes its downward movement it rotates the interlock valve 150 into a position to close port 148 and thus close the by-pass to reservoir from the relief valve 50. As shown in Figure 4, the rotatable valve plunger 150 is provided with a pair of radially extending fingers 178 and 179 which lie in different vertical planes and which, in addition, are circumferentially spaced from one another. A trip lever 180 is pivotally supported on a shaft 181 and is provided with an intermediate ball-shaped portion 182 which fits in a cam slot 183, Figure 2, formed in a plate 184 attached to the bracket 112.

As previously described, the bracket 112 moves with the piston rod 113 whereby the plate 184 will move up and down with the piston rod. It will be noted that the cam groove 183 has an inclined surface 185 which as it comes into engagement with the portion 182 will cause rotation of the trip lever 180 and thereby rotation of the valve 150.

The air piston 114 has now reached the end of its downward stroke; effected presentation of new work pieces at all broaching stations; and has positioned the interlock valve so as to close the by-pass from channel 147 to reservoir whereby pressure builds up in the system to shift the reversing valve. Attention is invited to the fact that the transfer arms 155 and 156 are not released by the cam 164 until practically the finish of the stroke of the air piston 114, and then they are returned to their intermediate positions by independently operating means such as the springs 169.

To insure that the transfer arms have been returned properly by the springs 169, additional interlocking means are provided comprising two interlock valves 186 and 187 which are associated with the respective operating shafts 158. One of these valves, 186, is shown in Figure 4 and comprises a plunger 188 which is continuously urged upward by a spring 189 into engagement with the periphery of a cam 190. The cam is split at 191 and is frictionally clamped to the shaft 158 by a set screw 192. The cam for the other operating arm is indicated by the reference numeral 191' in the diagram in Figure 13, and it will be noticed that these cams are provided with flat surfaces 192' and 193 respectively, the surfaces being of opposite hand because the arms move in opposite directions when transferring work to the tunnel broaches.

The valve 186 has a pair of ports 194 and 195 while the valve 187 has a pair of ports 196 and 197. The ports 194 and 196 are connected by a channel 198 to the line 48 while the ports 195 and 197 are connected by channel means 199 to the exhaust line 153. Each plunger has a groove 200 and a spool 201 and in the normal position of the plungers the spools 201 close the ports 194 and 196.

In this position of the parts there is no by-pass from the channel 48 to reservoir but upon counterclockwise rotation of the cam 190 and clockwise rotation of the cam 191', the plungers are depressed so that the grooves 200 effect parallel connections of the line 48 to reservoir by interconnecting ports 194 and 195 of one valve and ports 196 and 197 of the other valve.

This insures that the line 48 which is to supply the operating pressure for shifting the reversing valve is by-passed to reservoir until both of the transfer arms have been properly returned to their intermediate position. When this has been accomplished, the valve 50 closes, building up operating pressure for actuation of the broaching ram as well as pressure for shifting the reversing valve, whereupon the reversing valve is shifted and the broaching ram starts its downward stroke.

Each transfer arm is provided at the end with a pair of work engaging fingers 202 and 203 as shown in Figure 10, the finger 202 being fixed while the finger 203 is pivoted on a pin 204. A spring member 205 tends to urge the finger 203 toward the finger 202 to provide a friction grip on the work piece 66. It will be noted that the ends of the fingers are beveled at 206 whereby upon downward movement of the arms toward the work support 88 the work piece will be guided between the fingers and frictionally gripped thereby. The opposing faces 207 and 208, Figure 11, on the fingers engage the newly formed flat surfaces 69 on the work piece while a beveled surface 209 on the finger 203 engages the edge of the spool 70 on the work piece, thereby urging the same into contact with a shoulder 210. As the transfer arm moves upward the bevel surface 209 acts as additional insurance against the work piece dropping out of the grip of the fingers.

Referring to Figure 5, each transfer arm has an unloading finger 211 pivotally supported by a pin 212 between the work gripping fingers. The work engaging end of this finger is held out of engagement with the work by a spring pressed plunger 213 which is mounted in the end of the arm. As the arm swings over the tunnel broach an arm 214, which is integral with the finger and engaged on one side by the spring pressed plunger 213, hits a fixed abutment 215 whereby the finger is rotated in a clockwise direction which pushes the workpiece downward and out of engagement with the work engaging fingers and into the mouth of the tunnel broach.

In the mouth of this broach there are pivoted a series of work receiving members 216 which are shaped in the form of a bell crank and urged counterclockwise by spring pressed plungers 217. The plungers urge these members toward the center of the tunnel, thereby holding the work from dropping into the tunnel. After the transfer arm has discharged a work piece into the tunnel it returns to its intermediate position as previously explained while the work piece is supported by the members 216. The tunnel broach is provided with a series of broaching tools 218, the number depending upon the number of grooves to be cut in the periphery of the spool 71. These tools are clamped in radial slots 219 by set screws 220 and are radially adjusted by a series of adjusting bolts 221 which engage the back of the broaching tools.

As the broaching ram moves downward a pusher rod 222 supported in alignment with each tunnel broach by the yoke 142 engages the top of the work pieces and forces them through the tunnel broach, the work supporting members 216 yielding under the pressure to permit the work piece to pass through. The work is pushed through the tunnel sufficiently to clear the end of the broaching tools so that it may drop by gravity into a work receiving chute 223 as indicated in Figure 5 of the drawings.

At the same time that the work pieces in the tunnel broaches are being worked upon the other broaching tools are broaching the flats 69 on the sides of the work piece and after this has been completed, the latch dog 128 engages finger 127 of the air valve operating crank, shifting the plunger 121 into a position to effect upward movement of the air piston 114. The piston effects counterclockwise rotation of the bell crank 89, thus retracting the slide 79; counterclockwise rotation of the work transfer arm 155 and clockwise rotation of the work transfer arm 156 to pick up the work pieces at the first broaching station; and effects rotation of the trip lever 180 by engagement of the cam surface 224 in the slot 183 with the ball 182. This rotates the interlock valve 149 into the position in which it is shown in Figure 13. Thus the port 225 is closed again whereby upon subsequent shifting of the pilot valve plunger 44 by trip dog 226 carried by the broaching ram, fluid pressure may be delivered to the right end of the reversing valve housing 23 to shift the plunger 24 into a position to effect upward movement of the broaching ram.

This will, of course, be permitted if the work transfer fingers have completed their return movement to their respective intermediate positions so that the interlock valves 186 and 187 are closed. The broaching ram will now return to its upward position and the cycle will be repeated.

Means are provided for stopping the ram at the end of each cycle or even at any time during the cycle, comprising a stop valve 227 which as shown in Figure 13 has two ports 228 and 229, the former being connected by branch line 230 to channel 48 and the latter being connected by branch line 231 to the reservoir line 153. The rotatable plunger 232 of this valve has a depression 233 which may be rotated by the manually operable control lever 234 into a position to interconnect ports 228 and 229, thereby bypassing channel 48 to reservoir, shifting valve plunger 54 into a position to bypass the supply pump 31 to reservoir which will lower the pressure in the supply line below that necessary for operating purposes.

There has thus been provided an improved automatic broaching machine which may be constructed as a duplex machine and which will automatically and sequentially perform different broaching operations on a single work piece and having means for automatically feeding the work to a first broaching station, transferring work to a second broaching station and automatically ejecting the finished work from the machine.

What is claimed is:

1. In a broaching machine having a first broaching station and a second broaching station, the combination of a ram, means carried by the ram to effect a broaching operation simultaneously on a work piece at each station during advance thereof, a mechanism for automatically removing the broached work piece from the first station after the advance stroke of the ram, and means to return the ram and cause said mechanism to deliver the broached work piece to the second station for another broaching operation during the next advance stroke of the ram.

2. In a broaching machine, the combination of a first broaching station having means for receiving and positioning work for a first broaching operation, a second broaching station having means for receiving work from the first station and positioning it for a second broaching operation, means for simultaneously broaching the work at each station and ejecting work finished at the second station from the machine, and means operable between broaching operations to transfer work from the first station to the second station.

3. In a broaching machine having two broaching stations for sequentially performing different broaching operations on a single work piece, the combination of means for transferring work from the first station to the second station including an oscillatable arm, work gripping means in one end of the arm for gripping a work piece when swung to the first station, and abutment means at the second station and automatically operable for releasing said work gripping means when the arm is swung to the second station causing the work to drop into broaching position at the second station.

4. In a broaching machine having two broaching stations for sequentially performing different broaching operations on a given work piece, the combination of a work transferring arm oscillatable between said stations for conveying work from one station to the next, said arm having an intermediate position, detent means for holding the arm in said position, power operable means for alternately moving the arm to the respective stations and resiliently operable means for returning the arm after each movement of its intermediate position.

5. In a broaching machine having two broaching stations and a power operable ram for effecting simultaneously broaching operations at each station, the combination of a source of power for energizing said power operable ram, a transfer mechanism for conveying work from the first station to the second station and interlock means rendered effective by said mechanism during operation thereof to ineffectuate said source of power for ram operating purposes.

6. In a broaching machine having two broaching stations and a fluid operable ram for effecting a broaching operation simultaneously at each station, the combination of a source of fluid pressure for energizing said ram, a transfer mechanism for removing a work piece broached at the first station to the second station for a subsequent broaching operation, and interlock valve means responsive to operation of said mechanism for rendering said source of pressure ineffective for operating said ram.

7. In a duplex broaching machine, the combination of a first pair of broaching stations, each adapted to receive a rough work piece, a second pair of broaching stations adapted to receive work transferred from the respective first stations, a pair of work transferring arms for operating between respective sets of stations, a fluid operable ram for effecting broaching operations simultaneously at all stations, a source of fluid pressure for said ram, a control valve shiftable to render said source of pressure ineffective for ram actuating purposes, and interlock means controlled by said arms to shift said valve during movement of the arms whereby the ram will not be moved during work transferring operations.

8. In a broaching machine having a broaching station, a broaching ram movable with respect to said station on a cutting stroke to broach the work piece, and on a return stroke, a retractable arm automatically operable after the broaching stroke to pick up and remove the broached work piece from said station, and a reciprocable member automatically effective after the return stroke of said ram to load and clamp a new work piece at the broaching station.

9. In a broaching machine, the combination of a work support, automatically operable means for positioning and clamping a work piece on said support, broaching means for performing a first broaching operation on the work, a second broaching means, means to transfer the work piece from said support into cooperative relation with the second broaching means, and means operable simultaneously with the first broaching means for effecting relative movement between the work piece and the second-named broaching means to effect a second broaching operation on the work piece.

10. In a broaching machine, the combination of a first broaching station, a second broaching station, a common actuator for effecting broaching operations simultaneously at each station, means to transfer work from one station to the other including a movable arm, means in the end of the arm for gripping a work piece, means to swing the arm to one station and return during one stroke of the actuator, and means to swing the arm to the other station and return after the next stroke of the actuator.

11. In a broaching machine, the combination of a first broaching station, a second broaching station, an actuator for effecting a broaching operation at each station simultaneously, means to transfer work from one station to the other whereby successive broaching operations may be performed on a single work piece including a transfer arm, means normally holding the arm in an intermediate position, means operable after one stroke of the actuator for causing said arm to remove the broached piece from the first station, means operable after the next stroke of the actuator for moving the arm to the second station, and means at the second station for automatically releasing the work piece from the arm.

12. In a broaching machine having two broaching stations for sequentially performing different broaching operations on a given work piece, the combination of a work transferring arm oscillatable between said stations for conveying work from one station to the next, a shaft for supporting said arm and imparting oscillation thereto, power operable means for imparting a rotary movement to said shaft and a releasable connection between said arm and said shaft to safeguard against damage to the parts.

13. In a broaching machine having two broaching stations for sequentially performing different broaching operations on a given work piece, the combination of a work transferring arm oscillatably mounted for conveying work from one station to the next, a shaft supporting said arm, a yieldable connection between said arm and said shaft, detent means associated with said shaft for normally holding said arm in a position intermediate said stations, a fluid operable piston for positively imparting motion to the arm to cause movement thereof from the intermediate position to either of said broaching stations and resiliently operable means for returning the arm from either of said broaching stations to its intermediate position.

14. In a broaching machine having a work support, a reciprocable ram, and broaching means carried by the ram for broaching work mounted on the support, the combination of means for positioning and clamping the work including a hopper overlying the work support, said work support having a work receiving depression formed therein for holding work during broaching, a work injector slide reciprocable between the mouth of the hopper and the depression, means on the end of the slide limiting the escape of one work piece at a time from said hopper, means to reciprocate the slide, means pivotally supporting the slide for oscillation in a plane perpendicular to the support, and means to oscillate the slide in timed relation to its reciprocation to effect elevation of the work pushing end as it approaches the depression whereby said end will ride over the top of the work as it drops into said depression, and means to oscillate the slide in the opposite direction to clamp the work in the depression.

15. In a broaching machine having a work support and a reciprocable ram movable in a plane perpendicular to the support, the combination of means for shifting work pieces to a first broaching station on said support and clamping the same, broaching tools carried by the ram for broaching a series of flat surfaces on the work piece, a second broaching station having a stationary set of broaching tools extending parallel to the movement of the ram, means to transfer the work from the first station to the second station, and a plunger carried by the ram for forcing the workpiece past the stationary broaching tools to form a plurality of longitudinally extending grooves in the periphery of the work piece.

16. In a broaching machine having a fixed support and a reciprocable support, the combination of means forming a first broaching station including means to clamp the work to the fixed support, broaching tools carried by the reciprocable support and movable therewith for broaching the clamped work, means forming a second broaching station including a plurality of broaching tools secured to the fixed support, a plunger carried by the reciprocable support for forcing the work past the fixed tools, and means to transfer work from the first broaching station to the second broaching station.

17. In a broaching machine having a fixed support and a reciprocating support, the combination of means forming a first broaching station including means to rigidly clamp a work piece to the fixed support, broaching tools carried by the reciprocating support for broaching the clamped work piece, means forming a second broaching station including a plurality of yieldable work supporting members, means to transfer work thereto from the first station, a plurality of fixed broaching tools located beyond said work supporting members, and means carried by the reciprocating support for shifting the work through the yieldable members and past the stationary broaching tools simultaneously with the broaching operation at the first station.

18. In a broaching machine having a fixed support and a movable support, the combination of means for broaching a plurality of longitudinal extending splines in the periphery of cylindrical work pieces including a plurality of radially arranged spline broaching tools, a plurality of resilient work supporting fingers equally spaced about an axis passing through the center of said broaching tools and a plunger carried by the movable support for forcing the work through said fingers and past the tools, said work dropping by gravity out of the machine after the broaching operation has been completed.

19. In a broaching machine having a fixed support and a movable support, the combination of means forming first and second broaching stations on the support, an oscillatable transfer arm for transferring work pieces broached at the first station to the second station including a plurality of resiliently operated work grippers for frictionally engaging the work, a work releasing member carried by the transfer arm, means at the second station for engaging and actuating said release member to disengage the work from said grippers.

20. In a broaching machine having a fixed support and a movable support, the combination of means on the fixed support for forming two broaching stations, a transfer arm for transferring work from the first station to the second station, fluid operable means for reciprocating the movable support and causing simultaneous broaching operations at each station including a fluid control circuit, and control valve means in said circuit and responsive to the position of said transfer arm for rendering said circuit ineffective for broaching purposes during movement of the transfer arm for work transferring purposes.

21. In a broaching machine having a fixed support and a reciprocable support, the combination of means forming a first broaching station on the fixed support, broaching means carried by the reciprocable support for broaching work at said first station, a second broaching station formed on the fixed support, a work supporting hopper, a work loading slide for transferring work from the hopper to the first broaching station, a transfer mechanism for transferring work from the first station to the second station, a fluid operable piston for actuating said loader and transfer mechanisms, a separate hydraulic circuit having a source of pressure for actuating the reciprocable support, a bypass valve in said circuit, and means operable by said piston for opening and closing said valve for controlling the pressure in said operating circuit.

22. In a broaching machine having a support and a reciprocable broaching ram, the combination of means for supporting work in alignment with said ram, a work receiving hopper carried by the support, a work injector slide for moving work from the hopper to the work supporting means, a bell crank for oscillating said slide, an oscillatable arm having means for gripping and removing work after the broaching operation, spring means normally holding said arm in a neutral position, a reciprocable piston, means operatively connecting said piston and bell crank, and other means operable by the piston for causing positive oscillation of said arm in one direction during one direction of movement of said piston, said means releasing said arm for return by said spring.

WILLIAM D. AVERILL.
AUGUST L. HAMELBERG.